Patented Aug. 11, 1942

2,292,436

UNITED STATES PATENT OFFICE 2,292,436

DYEING

George Holland Ellis and Alexander James Wesson, Spondon, near Derby, England, assignors to Celanese Corporation of America, a corporation of Delaware No Drawing. Application August 3, 1940, Serial No. 351,202. In Great Britain September 20, 1939

8 Claims. (Cl. 8—25)

This invention relates to the dyeing of textile materials containing yarns of cellulose acetate or other cellulose ester and especially to the production of dark shades on surface-saponified cellulose ester materials.

In the partial saponification of cellulose ester fibres, e. g. with caustic alkali solutions, the reduction of acidyl content is not usually uniform throughout the cross-section of the fibre, a product being obtained in which the core is substantially unaltered while the cuticular sheath is converted to regenerated cellulose or, at least, is so low in acidyl content as to have substantially the same behaviour towards dyestuffs as regenerated cellulose. In this specification the term "surface-saponified cellulose ester" is used to denote products of this type. Such products can be coloured by means of dyestuffs having direct affinity for cellulose, e. g. direct cotton colours. However, the production in this way of dark shades which are of satisfactory fastness, particularly to rubbing, is attended with some difficulty owing to the fact that only a part of the material is available to carry the large proportion of dyestuff which is necessary to produce the desired shade.

According to the invention, valuable dark shades of very good fastness properties are obtained on surface-saponified cellulose ester textile materials by applying to or forming on the materials, together or separately, a dyestuff (which term is used as including a mixture of dyestuffs) for the cellulose ester core and a dyestuff for the cellulose sheath, the latter dyestuff being of such nature and present in such proportion as to impart a grey or other neutral shade to the materials in the absence of the former dyestuff.

Most conveniently the ready formed dyestuffs are applied to the materials, but, as indicated above, either or both of the dyestuffs can be formed on the materials, e. g. by applying components such as azo dye components or dyestuff derivatives such as salts of leuco vat dyestuffs or of reduced sulphur dyestuffs, and which have affinity for the core or for the sheath, and converting the dyestuff components or dyestuff derivatives into dyes on the material. In either case, one of the colour-yielding substances, which expression is used to include ready formed dyestuffs, dyestuff components and derivatives of dyestuffs, should have affinity for the cellulose core and the other for the sheath. Preferably the colour-yielding substance which has affinity for the core has no substantial affinity for the sheath, and vice versa. Instead of either of the colour-yielding substances, there can be used such a mixture of colour-yielding substances as will produce the desired shade.

The invention includes the products obtainable by the above defined process, i. e. surface-saponified cellulose ester materials having a dark colour due to the presence in the core and sheath respectively of dyestuffs having direct affinity for the cellulose ester and for cellulose respectively, or which have been formed on the materials from other colour-yielding substances having such affinity, the dyestuff in the sheath being of such nature and present in such proportion as to impart a grey or other neutral shade to the materials in the absence of the dyestuff for the core.

The dark shades contemplated in accordance with the invention are tertiary shades such as browns, navy blue, bottle green, khakis, drabs and the like. Such shades resemble the neutral shades in that they absorb a proportion of light of each wave-length, but differ in that they show a marked preferential reflection in some regions of the visible spectrum.

Where the colour-yielding substance is a diazotisable amine it can be converted to the requisite dyestuff on the materials by diazotisation and coupling with an appropriate coupling component. Similarly a coupling component on the materials can be converted by treatment with a suitable diazotised aromatic amine. Again, in the case of a leuco vat dyestuff or a reduced sulphur dyestuff conversion is effected by oxidation. The diazotisable amines which can be used as colour-yielding substances in accordance with the invention can themselves be dyestuffs. An example of such an amine having affinity for the sheath is a diazotisable direct cotton colour.

The preferred dyestuff for the sheath is a direct cotton colour. This direct cotton colour can, as mentioned above, be one which requires diazotisation and delevopment, e. g. with β-naphthol, to produce the desired grey or other neutral shade.

For the core, there can be used any dyestuff having affinity for cellulose ester materials, or which has been formed on the materials from a colour-yielding substance having such affinity. Advantageously, the dyestuff for the core is one which, in the absence of the dyestuff for the sheath, would give a primary or secondary shade, e. g. yellow, orange, red, blue or green.

When using dischargeable direct cotton colours and dischargeable cellulose acetate dyestuffs it is possible to obtain dischargeable dark shades, a result which is often rather difficult to obtain on cellulose acetate materials, since the dyestuffs available for dyeing in dark shades are not as a rule readily dischargeable.

As mentioned above the two dyestuffs may be applied simultaneously or separately. Most conveniently the dyes are applied simultaneously from a single bath. If desired the requisite saponification of the cellulose ester may be carried out concurrently with the dyeing by incorporating in the dyebath a suitable saponifying agent.

The invention is particularly concerned with the colouration of products obtained by surface saponification of textiles of commercial acetone-soluble cellulose acetate. Such an acetone-soluble cellulose acetate contains about 52–55% of acetyl calculated as acetic acid, while the product derived from it by surface saponification and which can be coloured according to the invention may contain, for example, 40–50% of acetyl.

The saponification may be carried out by any desired method provided the conditions are controlled so that only surface saponification occurs leaving the core substantially unaltered. Examples of suitable conditions for effecting this surface saponification are to be found in U. S. Patent No. 1,897,691 and British Specification No. 309,377.

The invention is illustrated by the following examples:

Example 1

A plain woven fabric composed of yarns of a surface-saponified cellulose acetate of acetyl value about 45% is dyed from a soap or fatty alcohol sulphate bath containing a direct cotton colour capable of yielding a grey or blackish shade on the cellulose sheath and a cellulose acetate dispersion dyestuff capable of yielding a pale to medium depth of a primary or secondary shade in the acetate core.

Suitable combinations of dyestuffs and the shades obtained are given below. The percentages of dyestuffs are based on the weight of the fabric.

| Direct cotton colour | Cellulose acetate dyestuff | Shade |
| --- | --- | --- |
| 1% Chlorazol Fast Black BKS. | 5% 4:4'-diamino-3:3'-dinitro-diphenyl methane (10% aqueous paste). | Sage green. |
| 1% Chlorazol Fast Black BKS. | 3% 4-nitro-2'-5'-dimethyl-4'-aminoazobenzene (10% aqueous paste). | Chocolate brown. |
| 3% Chlorazol Fast Black BKS. | 5% 1-methylamino-4-hydroxyethyl-amino-anthraquinone (10% aqueous paste). | Navy blue. |
| 1% Chlorazol Fast Black BKS. | 4% 4:4'-diamino-3:3'-dinitro-diphenyl-methane (10% aqueous paste) plus 2% 1-methyl-amino-4-hydroxy-ethylamino-anthraquinone (10% aqueous paste). | Bottle green. |
| 0.75% Benzo Fast Grey BM | 3% 4-nitro-2':5'-dimethyl-4'-aminoazo benzene (10% aqueous paste). | Tan brown. |
| 1.25% Benzo Fast Grey BM. | 3% 4-nitro-2':5'-dimethyl-4'-aminoazo benzene (10% aqueous paste). | Nigger brown. |

Similar results are obtained by applying the dyestuffs separately in either order, the acetate dyestuff from a soap bath and the direct cotton colour from a salt bath.

Example 2

A cloth similar to that treated in Example 1 is simultaneously dyed from a soap bath with ½% amino-azo-benzene for the core and 2% Diazo Fast Green GFL for the surface layer.

After rinsing it is diazotised and washed, and is then developed in with β-naphthol. The resultant shade is a full maroon, being the composite effect of a grey colouration in the sheath and red within the core.

Although the invention has been described more particularly with reference to the products obtained by surface saponification of acetone-soluble cellulose acetate textiles it is by no means limited thereto and may also be applied to surface-saponified cellulose triacetate or other surface-saponified cellulose esters, for example cellulose formate, cellulose propionate, or cellulose butyrate, or mixed esters, for examples cellulose acetate-butyrate.

Having described our invention, what we desire to secure by Letters Patent is:

1. Process for the colouration of surface-saponified cellulose ester textile materials in dark shades, which comprises coloring the materials with a dyestuff for the cellulose ester core and a dyestuff for the cellulose sheath, the latter dyestuff being of such nature and present in such proportion as to impart a neutral shade to the materials in the absence of the former dyestuff.

2. Process for the coloration of surface-saponified cellulose ester textile materials in dischargeable dark shades, which comprises applying thereto a dischargeable dyestuff having direct affinity for the cellulose ester core and a dischargeable dyestuff having direct affinity for the cellulose sheath, the latter dyestuff being of such nature and present in such proportion as to impart a neutral shade to the materials in the absence of the former dyestuff.

3. Process for the coloration in dischargeable dark shades of materials obtained by surface-saponification of textile materials of commercial acetone-soluble cellulose acetate, which comprises applying thereto a dischargeable dyestuff having direct affinity for the cellulose ester core and a dischargeable dyestuff having affinity for the cellulose sheath, the latter dyestuff being of such nature and present in such proportion as to impart a neutral shade to the materials in the absence of the former dyestuff.

4. Process for the coloration in dischargeable dark shades of materials obtained by surface-saponification of textile materials of commercial acetone-soluble cellulose acetate, which comprises applying thereto a dischargeable dyestuff having direct affinity for the cellulose ester core and a direct cotton color, the latter dyestuff being of such nature and present in such proportion as to impart a neutral shade to the materials in the absence of the former dyestuff.

5. Surface-saponified cellulose ester textile materials having a dischargeable dark color due to the presence in the cellulose ester core and the cellulose sheath respectively, of dischargeable dyestuffs for the cellulose ester and for cellulose respectively, the dyestuff in the sheath being of such nature and present in such proportion as to impart a neutral shade to the materials in the absence of the dyestuff in the core.

6. Surface-saponified cellulose acetate textile materials having a dischargeable dark color due to the presence in the cellulose acetate core and the cellulose sheath respectively, of dischargeable dyestuffs for the cellulose acetate and for cellulose respectively, the dyestuff in the sheath being of such a nature and present in such proportion as to impart a neutral shade to the materials in the absence of the dyestuff in the core.

7. Surface-saponified cellulose acetate textile materials having a dark color due to the presence in the cellulose acetate core of a dyestuff having direct affinity for the cellulose acetate, and in the cellulose sheath of a direct cotton color, the direct cotton color being of such nature and present in such proportion as to impart a neutral shade to the materials in the absence of the dyestuff in the core.

8. Surface-saponified cellulose ester textile materials having a dark colour due to the presence in the cellulose ester core and cellulose sheath respectively of dyestuffs for the cellulose ester and for cellulose respectively, the dyestuff in the sheath being of such nature and present in such proportion as to impart a neutral shade to the materials in the absence of the dyestuff in the core.

GEORGE HOLLAND ELLIS.
ALEXANDER JAMES WESSON.